(12) United States Patent
Singhal

(10) Patent No.: US 11,928,172 B2
(45) Date of Patent: Mar. 12, 2024

(54) SYSTEMS AND METHODS FOR A WEB BROWSER FOR USE IN HANDHELD WIRELESS DEVICES THAT RENDERS WEB PAGES WITHOUT ADVERTISEMENT

(76) Inventor: Tara Chand Singhal, Torrance, CA (US)

(*) Notice: Subject to any disclaimer, the term of this patent is extended or adjusted under 35 U.S.C. 154(b) by 1012 days.

(21) Appl. No.: 13/136,610

(22) Filed: Aug. 4, 2011

(65) Prior Publication Data

US 2013/0036343 A1   Feb. 7, 2013

(51) Int. Cl.
*G06F 16/957* (2019.01)

(52) U.S. Cl.
CPC ............................... *G06F 16/9577* (2019.01)

(58) Field of Classification Search
CPC ......... G06F 17/30905; G06F 17/30035; G06F 17/30247; G06F 17/30899; G06F 17/30867; G06F 17/30734; G06F 8/71; G06F 3/0484; G06F 16/9577
USPC .................................................. 715/205, 235
See application file for complete search history.

(56) References Cited

U.S. PATENT DOCUMENTS

| | | | | |
|---|---|---|---|---|
| 6,300,947 | B1* | 10/2001 | Kanevsky ...................... | 715/866 |
| 6,430,624 | B1* | 8/2002 | Jamtgaard et al. ........... | 709/246 |
| 6,457,030 | B1* | 9/2002 | Adams et al. ................ | 715/239 |
| 6,912,571 | B1* | 6/2005 | Serena ................... | G06Q 30/02 |
| | | | | 705/14.4 |
| 7,058,695 | B2* | 6/2006 | Takagi ................ | G06F 16/9577 |
| | | | | 709/217 |
| 7,895,523 | B2* | 2/2011 | Stockton ........... | G06F 17/30905 |
| | | | | 715/744 |
| 8,255,793 | B2* | 8/2012 | Chakrabarti ........ | G06F 17/2229 |
| | | | | 715/234 |
| 2002/0099829 | A1* | 7/2002 | Richards et al. ............. | 709/227 |
| 2002/0111910 | A1* | 8/2002 | Walsh ............................ | 705/51 |
| 2003/0107761 | A1* | 6/2003 | Kimura ................ | G06K 15/007 |
| | | | | 358/1.15 |
| 2004/0095400 | A1* | 5/2004 | Anderson et al. ............ | 345/864 |
| 2005/0223310 | A1* | 10/2005 | Wachholz-Prill et al. .................. | |
| | | | | 715/501.1 |

(Continued)

OTHER PUBLICATIONS

Whitson Gordon, AdFree Blocks Ads on Your Rooted Android Phone, Aug. 13, 2010.*

(Continued)

*Primary Examiner* — Andrew R Dyer
(74) *Attorney, Agent, or Firm* — Aldo Noto, Esq.; RIMON PC

(57) ABSTRACT

A system and method for a wireless browser operating in a handheld wireless device for efficient utilization of wireless networks wireless devices resources. The browser identifies ad-server reference links in a received html webpage before the browser can request the ad-server image files from their respective servers, deletes these links and collapses corresponding cells, to create a modified webpage. The wireless browser displays the modified webpage on the device screen. The browser by removing the request and receipt of ad file images from and into the wireless device over the wireless network makes efficient use of the wireless networks. The wireless browser inputs screen size and user desired font size parameters and uses these input parameters, parses the modified webpage into screen size segments and displays the segments one at a time that enables a user to navigate from a segment to another segment to efficiently view web page content.

20 Claims, 8 Drawing Sheets

(56) References Cited

U.S. PATENT DOCUMENTS

| | | | | |
|---|---|---|---|---|
| 2006/0036955 | A1* | 2/2006 | Baudisch | G06F 3/0481 715/747 |
| 2006/0248051 | A1* | 11/2006 | Meyers | 707/3 |
| 2008/0065982 | A1* | 3/2008 | Evanchik | G06F 3/0486 715/255 |
| 2009/0234716 | A1* | 9/2009 | Mallick | G06F 3/0482 705/14.54 |
| 2009/0271735 | A1* | 10/2009 | Anderson | G06F 9/451 715/815 |
| 2010/0106595 | A1* | 4/2010 | Baugher | G06F 17/3089 705/14.42 |
| 2010/0313129 | A1* | 12/2010 | Hyman | G06F 16/9577 715/719 |
| 2011/0022945 | A1* | 1/2011 | Yang | 715/234 |
| 2011/0055357 | A1* | 3/2011 | Kakuta | G06F 16/9577 709/219 |
| 2011/0173216 | A1* | 7/2011 | Newman et al. | 707/765 |
| 2011/0225142 | A1* | 9/2011 | McDonald | G06F 21/552 707/710 |
| 2011/0282997 | A1* | 11/2011 | Prince | H04L 63/1433 709/226 |
| 2012/0101907 | A1* | 4/2012 | Dodda | 705/14.73 |

OTHER PUBLICATIONS

What is a smartphone ?; WhatIs.com; May 24, 2011; 13 pages.*

Append; Merriam Webster; Apr. 10, 2010; merriam-webster.com; p. 1.*

"Include;" Merriam-Webster Online Dictionary; Retrieved Apr. 8, 2010; https://www.merriam-webster.com/dictionary/include; p. 1.*

"Include;" Roget's 21st Century Thesaurus; 2009; thesaurus.reference. com/browse/Include; Third Edition; the Philip Lief Group; p. 1.*

* cited by examiner

| | |
|---|---|
| using a wireless browser for efficient rendering of a webpage on a screen of a wireless device and receiving, by the browser, a requested web page from a server on a global network. | 100 |
| identifying ad-server reference links in the webpage and deleting these links in the received webpage. | 102 |
| collapsing the corresponding empty cells of the deleted links and then displaying a modified webpage on the device screen. | 104 |
| saving the links, before deleting, in an ad-server list and displaying the list at end of the webpage, enabling a device owner to selectively choose to view their corresponding ad images. | 106 |
| inputting screen and font size parameters, parsing the webpage into screen size segments and displaying the segments one at a time, for efficient viewing of webpage content. | 108 |
| identifying image reference links to a server from where the webpage itself has been received and saving these links in an image link file and deleting, before displaying the modified webpage. | 110 |
| displaying the image link list file at the bottom of the webpage, enabling a user to select, fetch and display a one or more images of the links. | 112 |
| identifying in the received webpage, number of image file links to a server from where the webpage itself has been received enabling a user to select, fetch and display images from the links. | 114 |
| fetching by the wireless browser, the images from the webpage server and displaying the images on the device screen if the number of image files is below a threshold. | 116 |
| identifying by the wireless browser, image file links to a server and stopping requests and receipts of the image files from these links and displaying the modified webpage enabling a device owner to read an accompanying text and then decide to request, receive and view individual image files. | 118 |

Figure 4

SYSTEMS AND METHODS FOR A WEB BROWSER FOR USE IN HANDHELD WIRELESS DEVICES THAT RENDERS WEB PAGES WITHOUT ADVERTISEMENT

CROSS REFERENCE

None

FIELD OF THE INVENTION

Systems and methods for a wireless browser for use in handheld wireless devices that makes efficient utilization of the wireless network resources and in the wireless device provides a user friendly and efficient rendering of the web pages on the limited size display screens of the wireless devices.

BACKGROUND

Handheld wireless computing and communication device with the ability to connect to the Internet have become very common. Such devices may include smart phones and tablet computers. Such devices also have small display screen sizes relative to desktop or laptop personal computers.

The same browser application software that is used in the personal computers is ported for use in the handheld wireless devices without taking into account the unique features and limitations of the handheld wireless devices.

These wireless devices have the ability to connect to the internet to receive web pages and other digital content from the web servers. The digital content in the servers on the global network is formatted to be displayed on the larger screen size of personal computers. Therefore, digital information that is received from a web server on the global network for display on a screen of the wireless device is not suitable for their limited screen sizes.

Further, invariably the webpage has embedded advertising content. Such ad content is formatted to be displayed on the left, right, top and sometimes in the middle of the page. Such content does not fit and is a distraction for display on a small screen. Some in the industry have attempted to address these problems by creating new web pages that are formatted for a mobile device and others in the industry have addressed the problem by providing zooming and scrolling features to view full size web pages. These approaches are not entirely satisfactory.

Hence, it is the objective of the embodiments herein to be able to have a browser with features and functions that are optimal for the handheld wireless devices. It is further the objective to provide for a wireless device browser that is optimized for wireless networks and handheld wireless devices.

SUMMARY

Tutorial type information is first provided to understand the embodiments described herein. A web browser uses a language known as hyper text markup language (HTML) and a communication protocol known as hyper text transport protocol (HTTP). A browser communicates between a computer and a server on the global network using HTTP. A browser uses HTML to render a webpage for display on the display screen.

The webpage is organized in table-cell structures for spacing and positioning the web page content on a display screen. A cell may be a space cell or may have content. The content may be text, or links to images in global servers. The links may be of two types, one link is to external servers that are used for storing advertisement images, while the other links may be to images that are in the image file folders of the servers that store the HTML webpage, from where the webpage is fetched on a user request in the browser.

The links in a web page begin with a unique identifier, "href", and identify the root server, the directory, and subdirectory where the image content is stored. The images may be in the form of animated images such as in a flash application. The images have file extensions such as gif that identify the type of file and the application that can process it. The html file itself has extension of .htm or .html and the root html file for a webpage is identified as index.htm or default.htm A browser, on user request, requests an html page and receives html file that is without the image content. The browser then scans the received html file and finds cells with image file references, and performs an individual request fetch for each of the image files. The browser receives each image file and embeds the images in each cell to complete the webpage display. It is believed, the operation of a web browser in handheld wireless devices is the same as in personal computers.

Based on industry news, placement of advertisements in a web page that have to be viewed has always been a contentious issue, where the advertiser wants to force an ad image to be displayed and viewed and a viewer does not want to be forced to watch such as ad-image. However, advertisement images have become an essential part of a webpage as content is free and ad is used as a source of revenue by the business behind the web page.

The issue of delivery of ads is complicated by the ad-images that are delivered to the wireless device screens as part of a web page, as the limited size screens are ill-equipped to receive and display such ad images. It is generally acknowledged by everyone that wireless device users do not want embedded ad images on their small screens. It is also well known that in Internet use, the incoming bandwidth usage is by far greater than outgoing bandwidth usage.

The problems or issues can be further amplified in that in handheld wireless devices, wireless network capacity is limited and the bandwidth is metered and a user pays for bandwidth usage—unlike at home/office using landlines.

Advertisement images are usually unwanted and take up precious bandwidth as well as slow loading time of the webpage. Furthermore, a user has a limited comprehension of webpage content on a small screen size and limited time on the move. Still further, the webpage content creator may not know or be mindful of the wireless type receivers and their limitations.

A solution to the above identified issues is to have a Wireless Browser that is optimized for handheld wireless device operations. A Wireless Browser would not only optimize the use of limited and precious wireless network resources but also provide for an efficient rendering of web pages and other digital content on the display screens of the handheld wireless devices.

The benefits of the Wireless Browser is that it provides for a faster webpage loading time on handheld wireless devices and provides for an intelligent and prioritized loading that screens and prioritizes content for loading.

Further, the Wireless Browser parses and displays a webpage text and possible associated images in screen size chunks for easy visibility, comprehension, and sequencing.

These features of Wireless Browser, it is believed, reduce wireless network loading, optimizes network usage, and reduces the cost of bandwidth for the user and renders efficient display of web pages on the limited size screens of wireless handheld devices.

These and other aspects of the embodiments herein are described and would become more clear with the help of the accompanying drawings and the accompanying description.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIG. 4 is block diagram hat illustrated method features of the present embodiment of the invention of a Wireless Browser.

DESCRIPTION

Introduction

Figure 1A:
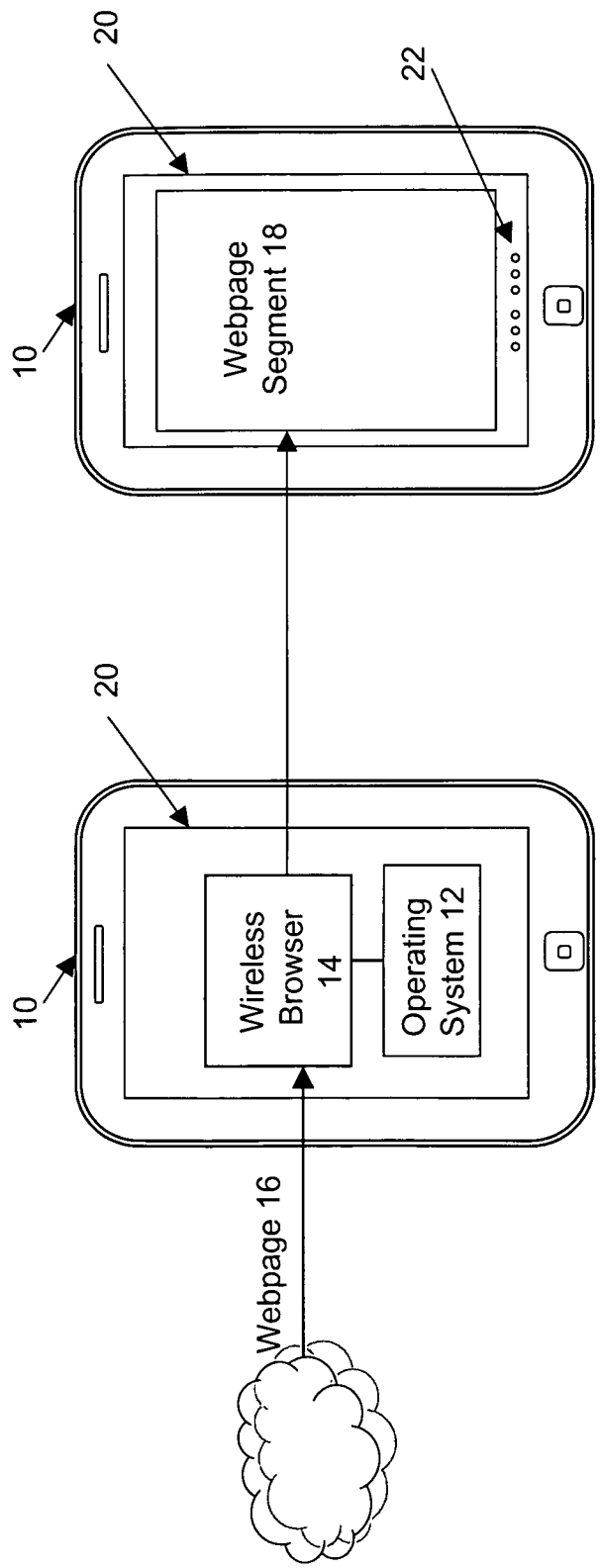
FIG. 1A is a block diagram that illustrates features of the present embodiments of the invention of a Wireless Browser in a wireless device.

With reference to FIG. 1A, in a preferred embodiment, a portable wireless computing and communication device 10 that may be a smart phone or a tablet computer has a Wireless Browser 14. The device 10 has a display and touch screen 20 that operates in the device 10 in conjunction with a device operating system 12.

The Wireless Browser 14 (WB 14) receives an html webpage 16 from a server on a global network and optimizes the received webpage for the optimal operation of the wireless networks working in conjunction with the wireless devices.

In prior art, a webpage is a composite of text and images organized for display in an invisible table and cell structure or partitions. The text and the table-cell structure are contained in an html file. The images are contained in the html file in a cell by reference to an image file that is not as yet part of the webpage. The size of an html file is of the order of a few kilobytes. The size of each of the images, for which a link reference is only provided in the html file is of the order of 10 to 25 kilo bytes. There are multiple such image files such that the total size of the image files of a webpage may be of the order of a few hundred kilo bytes. Each of these images is individually and automatically fetched by a prior art browser for rendering in its corresponding cell location in the webpage.

Figure 1B:
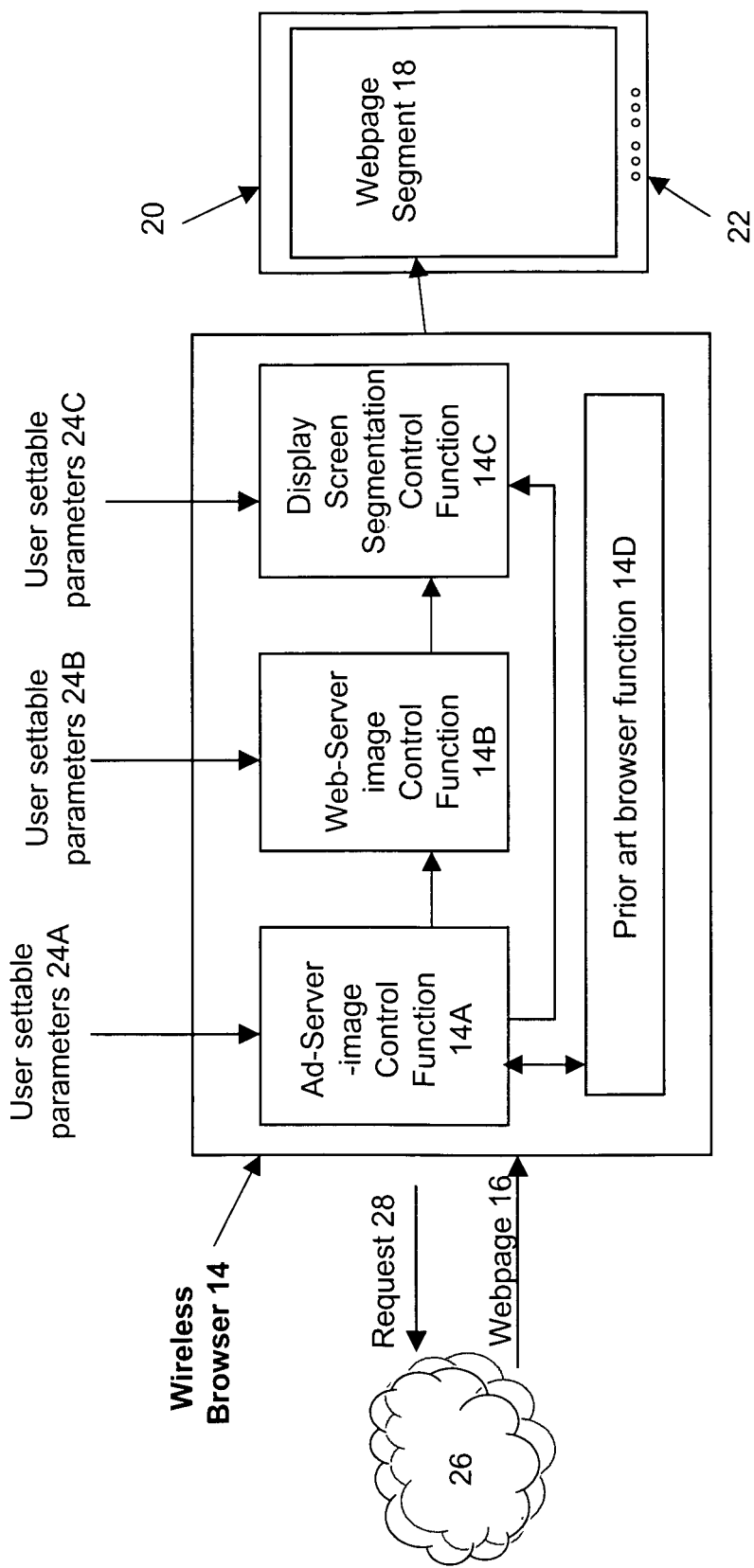
FIG. 1B is a block diagram that illustrates features of the present embodiments of the invention of a Wireless Browser in a wireless device.

With reference to FIG. 1B, the functions of the WB 14 are illustrated. The WB 14 has a ad-server image control function 14A with user settable parameters 24A, a web-server image control function 14B with user settable control parameters 24B, a display segmentation control function 14C with user settable parameters 24C, and a prior art web browser function 14D. The WB 14 requests 28 a webpage from the global net 26 and receives webpage 16 and outputs display segments 18 to the screen 20 of the wireless device.

Wireless Browser Functions 14A and 14B working in conjunction with prior art function 14D enable a device user to control which images are requested. By giving a wireless device user, control of which images in a webpage are desired and which are not desired and of the images that may be desired, how to selectively fetch and receive them, that is optimized for the individual user and the specific wireless device, reduces unnecessary wireless network traffic between the servers and the wireless devices.

Wireless Browser Function 14C enables display content of a web page to be displayed and viewed in a limited screen size of the handheld wireless device. The function 14C displays on the screen 20, webpage segments 18. The webpage segments 18 are optimized for the specific screen size and the specific font size base on user settable parameters in the WB 14. The segments may be navigated with the help of sequence icons 22 and this provides for an efficient viewing of webpage content without the need to zoom and scroll a miniaturized web page as is done in the prior art These aspects of the WB 14 are described in detail below, where FIGS. 2A-2B-2C-2D illustrates logic features of the WB 14. FIG. 3, describes functions of WB 14 and FIG. 4 describes features of a method. The headings are provided for the convenience of the reader.

Optimization of Wireless Browser 14 for Ad-Server Images

Each of the link references in a webpage begins with href, an html construct that enables all such link references in the webpage to be readily identified. Further, each href link provides a full path to the file in the web server where the file is stored and fetched from. A full path contains the web server identification by either name or an IP address along with directories and subdirectories where the ad-image file is stored. An ad-image file web server is different than the web server which stores the webpage html file itself. Hence the ad-image file links are readily identified based on this link information in the href.

Figure 2A:
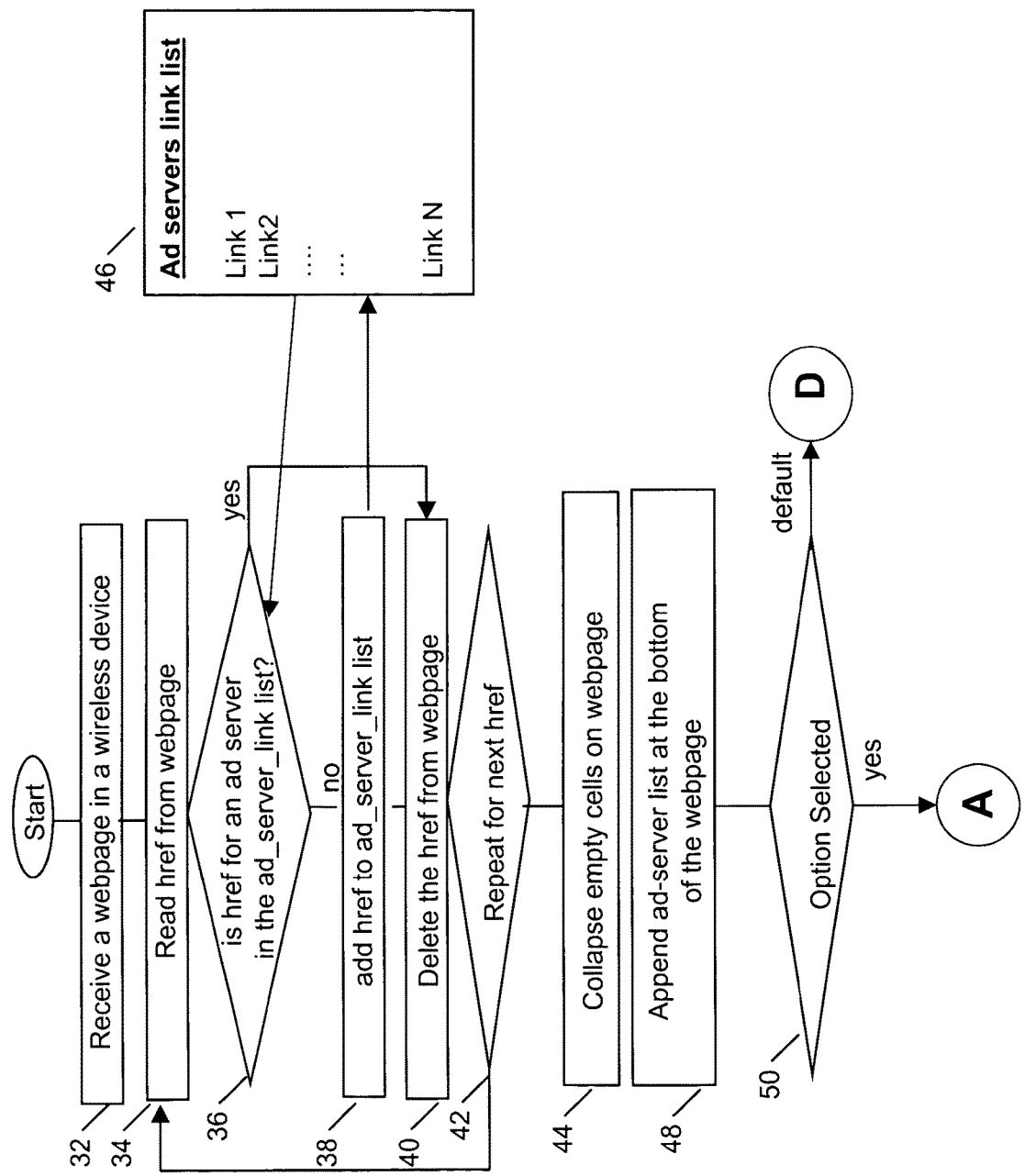
FIG. 2A-2B-2C-2D are logic diagrams that illustrate features of the present embodiment of the invention for a Wireless Browser.
Figure 3:
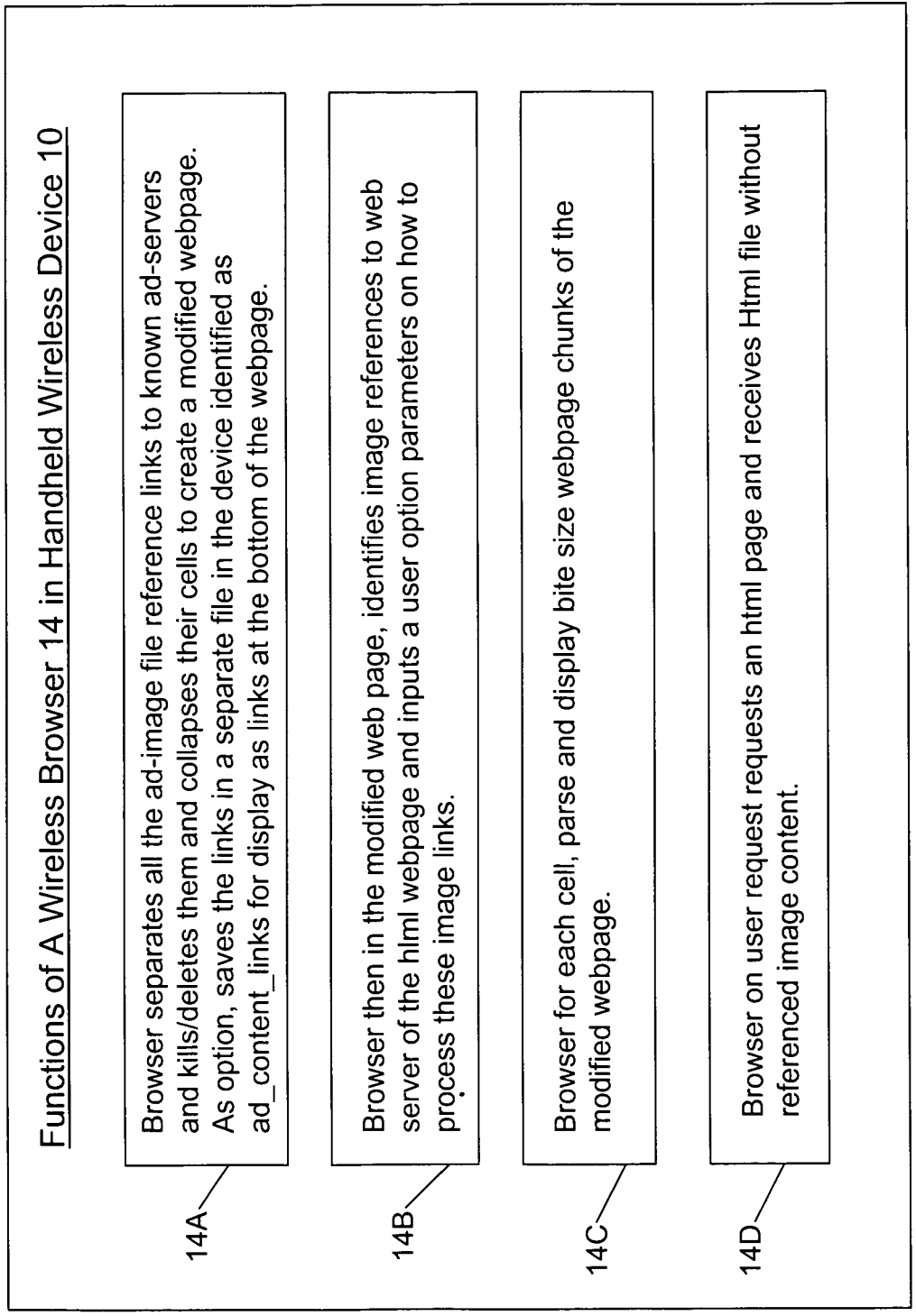
FIG. 3 is a block diagram that illustrates function features of the present embodiment of the invention of a Wireless Browser.

FIG. 2A illustrates the logic of the WB 14 for optimization of ad-server images. The WB 14, at step 32, receives an html webpage into a wireless device. An html webpage is one where the images have not been fetched from their respective web servers. At step 34, WB 14 reads a href html construct in the webpage. At step 36, WB 14 decides if that specific href is to an ad-server and if that link is already present in an ad-sever list 46.

An ad-server list 46 is created and maintained in the WB 14 and is based on a priori identification of ad-servers. The industry uses the technological approach of providing ad-image links in the web pages that are stored in the web servers but maintains the actual ad-images in a different web server to be fetched from, based on a request from the WB 14 in a user device 10. This industry approach enables accounting and control of how many times and which ad-images have been delivered to the web pages and which computers they have been delivered to. This approach facilitates for accounting and billing, and generation of statistical reports to the advertisers.

At step 36, if the decision is yes, the logic jumps to step 40 to delete the ad-server link from the html webpage. If the decision is no, the ad-server link is placed in that ad-server list 56 at step 38. At step 42, this process of steps 34 to 40 is repeated until all href link references to ad-server links in a web page are exhausted or have been dealt with.

At step 44, the empty cells as a result of the having deleted their links are collapsed. At step 48, based on User settable option 24A, the ad-sever link list is appended at the bottom of the webpage, giving a user an option to individually click each link to see their ad-images.

At step 50, user settable parameters are 24B are checked. If a default option has been selected the flow chart bypasses the Wireless Browser Function 14B and goes to Wireless Browser Function 14C to with a flow chart as in FIG. 2D at D.

The default option is that if the number of image links in a webpage such as that might be the case for login page, payment page, news/information webpage is less that a threshold, the function 14B is bypassed and the logic flow jumps directly to Wireless Browser Function 14C as in FIG. 1B.

Figure 2B:
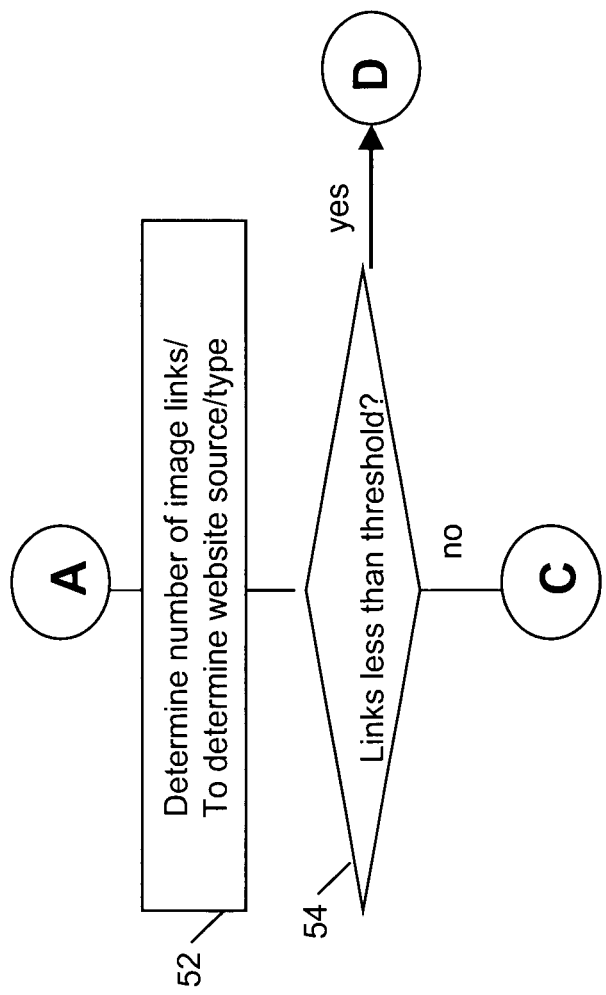

At step 50, is a user settable option 24B is selected that is other than the default option as described above, the logic control flow moves to C in the flow chart in FIG. 2B.

The list 46 is created for each webpage or it may be created for a session and then deleted based on user option with a desire to see or not see the ad-image files. Alternatively the WB 14 may maintain a permanent ad-server list. The above steps complete the WB 14 operation directed to removing the unnecessary and unwanted ad-images from being received in the WB 14. This completes the optimization of the webpage for the ad-server image links.

Optimization of Wireless Browser for Web Content Images

It has to be recognized that web pages on the global serves contain different type of web contents. This content may generally be categorized in (i) news and information websites, (ii) shopping sites, (iii) social community sites, (iv) secure sites for login and payment transaction, and (v) video websites such as Youtube®.

These websites may be further categorized by the number of image links, animated image links etc. A different optimization approach and logic may be used for each of these different websites.

The WB 14 may use an approach that is based on the total number of image links on a specific webpage. It is assumed and believed that a webpage with number of image links less that a threshold X is likely to be one of the types of news and information site or a payment and e-commerce type. It is further assumed that a webpage with a large number of image links exceeding a threshold Y may be for a shopping site or a media rich site.

In one approach for an efficient rendering of webpage for display, a site with fewer images, such as less then six, is immediately displayed with these images. A web page with larger number of image links such as greater than twelve, may not fetch any of these images and instead place such links in their respective cells enabling a reader to see the accompanying text and decide if to fetch that image. Alternatively, the first six of these images may be automatically fetched and the remainder may remain as links in their cells giving the user an idea of the webpage content based on the first six images and deciding to selectively fetch all the remainder or some of these images.

Figure 2C:
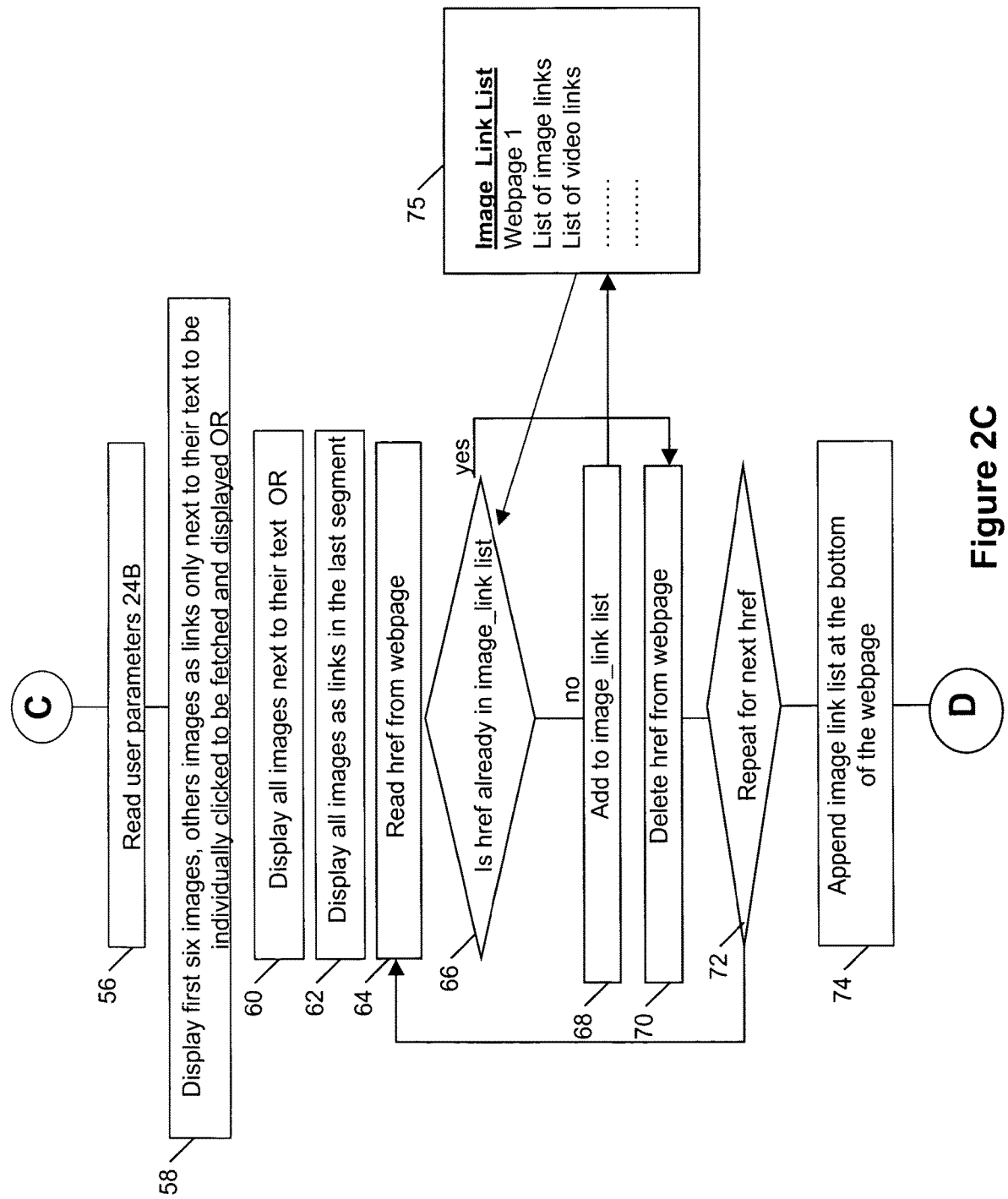

FIGS. 2B and 2C describe the flow of the logic of WB 14 for optimization of the display from the image links in the webpage other than the ad-server image links.

As illustrated in FIG. 2B, at step 52, the number of the image links in the entire webpage is determined to decide if that number is less than or greater than a threshold. At step 54, if the links are less than a threshold, the logic flow jumps to D in FIG. 2D. At step 54 if the number of image links in the webpage is greater than a threshold number, the logic flow jumps to C as in FIG. 2C. That is the number is heuristically mapped to one of the web types. For small number of links, path D is chosen and for large number of images, path C is chosen.

As illustrated in FIG. 2C, at step 56, the user set parameters 24B for optimization of the image links are read. At step 58, in one option, the first six or so image links are automatically fetched and their images displayed, while other image links remain as links on the webpage. This enables a user to quickly determine if this webpage content are of interest and selectively choose to load other images beyond the first six images. The number six is estimated number that could be higher or lower and may be as much as dozen or so. It is believed that many web pages have number of images less than a dozen or so.

At step 60, in one option, all the images are displayed next to their text. In step 62, as another option, all images are displayed as links at the end of the webpage.

The steps for this option 62 are described below. At step 64, a href is read from the webpage. At step 66, it is determined if this href is already in an image link list 75. If the decision is yes, at step 70, the href is deleted. If the answer is no, at step 68, the href is saved in the list 75. At step 72, the process steps 64 to 72 are repeated for each href. At step 74, the list 75 is appended at the end of the webpage. The logic then returns to D in FIG. 2D.

Webpage Segmentation and Sequencing

Figure 2D:
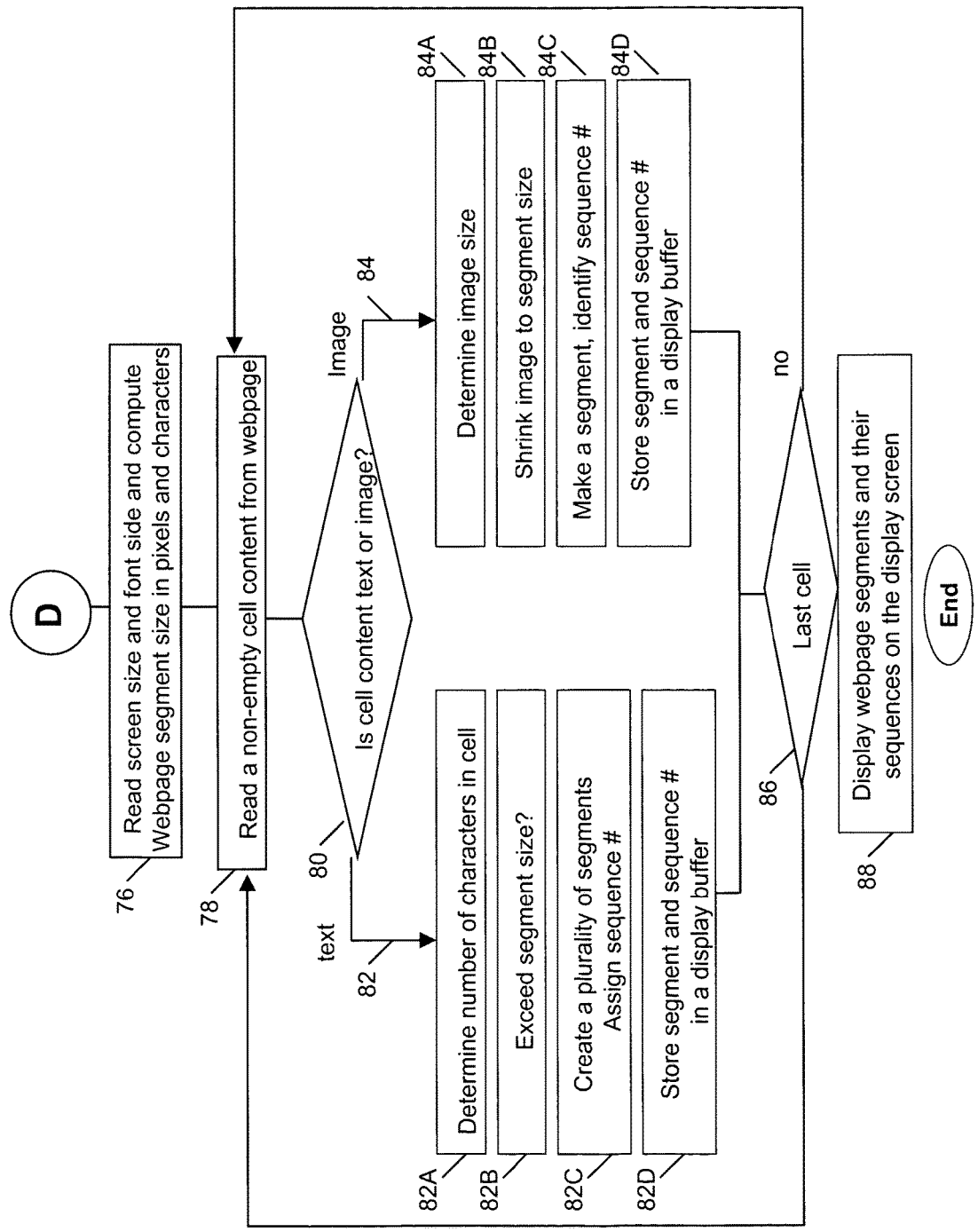

Wireless Browser Function 14C, as in FIG. 1A, is described herein with the help of FIG. 2D. The webpage is segmented into multiple segments to fit the screen size of the wireless device before being displayed. Each of the segments may be text, an image, or a composite of text and image depending upon the screen size.

The webpage is parsed into webpage segments for optimal display on the limited size screen of the wireless device. User set parameters 24C of screen size and font size are used to create these webpage segments. These webpage segments are displayed with navigation icons 22 from one segment to another segment.

FIG. 2D provides detailed logic for this function for optimizing the display of web page segments on the limited size screen of the handheld wireless device.

FIG. 2D is a logic diagram that illustrates the process of parsing a webpage into a sequence of display screen size segments. At step 76, the screen size parameters and the desired font size are read from memory and a segment size in pixels and characters is computed. At step 78, a non-empty cell, a cell that has either text or image is read from the webpage. At step 80, the cell is checked for text or image content. The path 82 is for text content and path 84 is for image content in the cell.

At step 82A, the number of characters in the cell is computed. At step 82B, logic determines if the cell exceeds segment size. At step 82C, the number of characters exceeds the screen size as has been computed in step 76. At step 82C, multiple segments are created and at step 82D, each of these segments is assigned a sequence number and stored in a display buffer. Each segment and its sequence number are stored in a display buffer.

In path 84, a similar process is used for the cell content that is an image. At step 84A, image size in pixels is determined. At step 84B, the image size is compared to the screen size as has been computed in step 76. At step 84C, the size exceeds the screen size; the image is zoomed to fit the segment size. At step 84D, a segment is created and assigned a sequence number and the segment and the sequence number is stored in a display buffer.

At step 86, it is determined if it was the last cell on the webpage. If it was not the last cell, the process is repeated for the next cell starting at step 78. If it was the last cell, then at step 88, the webpage segments along with their sequence numbers are displayed on the screen. One approach to segment navigation 22 is as illustrated in FIG. 1, where a lighted dot illustrates which one of the many segments is being displayed and a scroll on the touch screen brings up the segments in sequence.

WB 14 Settable Parameters

As illustrated in FIG. 1B, each of the functions 14A, 14B and 14C of the WB 14 has settable parameters 24A, 24B and 24C respectively. These settable parameters are in addition to those already provided by the standard browser function 14D.

The settable parameter for function 14A is if the user desires to discard all ad-server links permanently from the webpage or make them available as a list at the end of the web page for later optional and selective use. It is believed that most users if not all would prefer the option of not seeing any ad-images at all.

The settable parameters for function 14B are how a user may decide to view the web server images that are part of the webpage content. There may be different options that are identified here. These options depend upon the number of such images and the correspondingly on the type of the website content. In one option, if the total number of such images is less than a threshold number such as 6 or 10, then all the images are fetched and displayed in their respective cell locations. This may be identified as the default option. Examples of default web pages may be for login, payment, and news/information web pages.

If the number of image-links exceeds that default value, then the images may be displayed in three different options. In the first option, the default number of images are fetched automatically and displayed and after the default number they are fetched and displayed on demand. The demand is satisfied in two different ways, the image link is displayed next to the text and the image is fetched on clicking the link. Or the image is automatically fetched and displayed for that specific segment as each segment is displayed and navigated to on the display screen. This approach optimizes the images that are required by the user and takes into account, to learn that type of website content or to go through the entire site in detail as in shopping and have plenty of shopping time. Different users may desire different experience in their limited screen size wireless devices.

The parameters 24C for function 14C are screen size and the desired font size. Based on their use pattern and types of websites visited the WB 14 may be customized for efficient operation for each individual user.

Wireless Browser 14 Functions

As shown in FIG. 3, the functions of the WB 14 are illustrated. In Function 14A, Browser separates all the ad-image file reference links to known ad-servers and kills/deletes them and collapses their cells to create a modified webpage. As option, saves the links in a separate file in the device identified as ad_image_links for display as links at the bottom of the webpage. Browser finds, identifies, and separates or removes all the image file reference links identified as ad_image_links and saves them in a separate file in the device. Browser identifies all ad-image references and kills/deletes all these image file references and their cells in the webpage to create a modified webpage. Alternatively, Browser then identifies image references to a known ad server and kills/deletes these image file references and their cells in the webpage to create a modified webpage with the list placed at the end of the webpage. Browser creates and maintains a table of all ad content storage servers on the world-wide-web In Function 14B, Browser in the modified web page, identifies image references to web server of the html webpage and inputs user option parameters on how to process these image links.

In Function 14C, Browser for each cell, parse and display bite size webpage chunks of the modified webpage. Browser 14 parses and displays webpage segments of the modified webpage. Optionally, and on user request displays the file with the image links.

In Function 14D, Browser on user request requests an html page and receives Html file without referenced image content. That is Browser on user request requests an html page and receives Html file without referenced image content.

A handheld wireless device has a wireless browser operating in the handheld wireless device. The browser identifies ad-server reference links in a received html webpage before the browser can request the ad-server image files from their respective servers, deletes these links and collapses their corresponding cells, to create a modified webpage.

The wireless browser displays the modified webpage on a screen of the wireless device, wherein the browser by removing the request and receipt of ad file images from and into the wireless device over the wireless network, makes efficient use of the wireless device and the wireless network.

The wireless browser saves the ad-server reference links, before deleting, in an ad-server list file for display of the list at bottom of the modified webpage that enables a device owner to selectively decide to click a one or more links to request, receive and view the ad file images.

The wireless browser inputs the wireless device display screen size and user desired font size parameters and uses these input parameters, parses the modified webpage into screen size segments and displays the segments one at a time that enables a user to navigate from a segment to another segment to efficiently view web page content.

The wireless browser identifies in the received webpage, image file links to a server from where the webpage itself has been received. When the number of links exceed a threshold, saves these links in an image link file and deletes the links from the webpage, then displays the modified webpage on the screen of the device with the image link list file at the bottom of the modified webpage that enables a user to select, fetch and display a one or more images from the links.

The wireless browser, if the number of image files is below the threshold, fetches the images from the webpage server and displays the images on the device screen.

The wireless browser identifies in the received webpage, image file links to a server from where the webpage itself has been received and stops requests and receipts of the image files from these links and displays the modified webpage with the image file links that enables a device owner to read an accompanying text and then decide to request, receive and view individual image files. The wireless browser fetches the images from the webpage server and displays the images on the device screen.

A system for efficient rendering of webpage content on a screen of a handheld wireless device has a wireless browser for efficient rendering of a webpage on a screen of a wireless handheld computing device, where the wireless browser receives, and a requested web page from a server on a global network.

The wireless browser identifies ad-server reference links in the received webpage that have been pre-stored in an ad-server list file and deletes these links in the received webpage and collapses their corresponding empty cells of the deleted links and then displays the modified webpage on the device screen.

The wireless browser parses the webpage into screen size segments and displays the segments one at a time that enables a user to move from a segment to another segment.

The browser saves the links, before deleting, that are not already in the ad-server list, in the ad-server list file.

The browser identifies image reference links to a server from where the webpage itself has been received, saves these links in an image link file and a video link file and deletes the links from the webpage, then displays the modified webpage on the screen of the device. The browser displays the image link list file at the bottom of the webpage and enables a user to select, fetch and display a one or more images of the links.

Method of Operation

As shown in FIG. 4, a method for displaying information on a display screen of a wireless device has the following steps, where all the steps may not be used or used in the order specified.

At step 100, using a wireless browser for efficient rendering of a webpage on a screen of a wireless device and receiving, by the browser, a requested web page from a server on a global network.

At step 102, identifying ad-server reference links in the webpage and deleting these links in the received webpage.

At step 104, collapsing the corresponding empty cells of the deleted links and then displaying a modified webpage on the device screen.

At step 106, saving the links, before deleting, in an ad-server list and displaying the list at end of the webpage, enabling a device owner to selectively choose to view their corresponding ad file images.

At step 108, inputting screen and font size parameters and using the parameters, parsing the webpage into screen size segments and displaying the segments one at a time, enabling a user to move from a segment to another segment for efficient viewing of webpage content.

At step 110, identifying image reference links to a server from where the webpage itself has been received and saving these links in an image link file and deleting the links from the webpage, before displaying the modified webpage on the screen of the device.

At step 112, displaying the image link list file at the bottom of the webpage, enabling a user to select, fetch and display a one or more images of the links.

At step 114, identifying by the wireless browser, in the received webpage, number of image file links to a server from where the webpage itself has been received and saving by the wireless browser these links, when the number of links exceed a threshold, in an image link file and deleting the links from the webpage, then displaying the modified webpage on the screen of the device with the image link list file at the bottom of the modified webpage, enabling a user to select, fetch and display a one or more images from the links.

At step 116, fetching by the wireless browser, the images from the webpage server and displaying the images on the device screen if the number of image files is below a threshold.

At step 118, identifying by the wireless browser, in the received webpage, image file links to a server from where the webpage itself has been received and stopping by the wireless browser requests and receipts of the image files from these links and displaying the modified webpage with the image file links enabling a device owner to read an accompanying text and then decide to request, receive and view individual image files.

In summary, the embodiments herein are on systems and methods for efficient utilization of wireless networks for communication with wireless devices that has a wireless browser operating in a wireless device. The browser identifies ad-server reference links in a received html webpage before the browser can request the ad-server image files from their respective servers, deletes these links and collapses corresponding cells, to create a modified webpage.

The wireless browser displays the modified webpage on the device screen. The browser by removing the request and receipt of ad file images from and into the wireless device over the wireless network makes efficient use of the wireless networks. The wireless browser inputs screen size and user desired font size parameters and uses these input parameters, parses the modified webpage into screen size segments and displays the segments one at a time that enables a user to navigate from a segment to another segment to efficiently view web page content.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A method for a mobile handheld wireless computing and communication device selected from the group of a smart phone and a tablet computer, comprising the steps of:
providing by the handheld wireless mobile device a processor, a memory and a wireless browser logic stored in the memory and operating in the processor, requesting by the wireless browser logic from a server on a global computer network an HIM L formatted webpage, and receiving and storing by the logic in a temporary memory of the device the HTML formatted webpage;
identifying first by the wireless browser logic ad-server reference links in the received HTML formatted webpage, disabling execution of the identified ad-server reference links from fetching the ad-server image files from their respective ad-servers;
deleting by the wireless browser logic the identified ad-server reference links in the received HTML formatted webpage and collapsing by the wireless browser logic the corresponding empty cells of the deleted ad-server reference links in the received HTML formatted webpage and then displaying a modified webpage on the device screen, the modified webpage reflecting the collapsed cells of the identified ad-server reference links and including an appended list of ad-server reference links deleted from the HTML formatted webpage.

2. The method as in claim 1, comprising the steps of:
saving the links, before deleting, in an ad-server list and displaying the list at end of the received HTML formatted webpage, enabling a device owner to selectively choose to view their corresponding ad file images.

3. The method as in claim 1, comprising the steps of:
inputting by the wireless browser logic parameters of, a screen size of the wireless device and a user desired font size;
parsing by the wireless browser logic using the parameters, the received HTML formatted webpage into screen size segments and displaying the segments one at a time, for a user to move from a segment to another segment for viewing of content from the received HTML formatted webpage.

4. The method as in claim 1, comprising the steps of:
a. identifying image reference links to a server from where the HTML formatted webpage itself has been received;
b. saving these links in an image link file and deleting the links from the HTML formatted webpage, before displaying the modified webpage on the screen of the device.

5. The method as in claim 4, comprising the steps of:
a. displaying the image link list file at the bottom of the received HTML formatted webpage;
b. enabling a user to select, fetch, and display a one or more images of the links.

6. The method as in claim 1, comprising the steps of:
a. identifying by the wireless browser, in the received HTML formatted webpage, number of image file links to a server from where the HTML formatted webpage itself has been received;
b. saving by the wireless browser these links, when the number of links exceed a threshold, in an image link file and deleting the links from the HTML formatted webpage, then displaying the modified webpage on the screen of the device with the image link list file at the bottom of the modified webpage, enabling a user to select, fetch and display a one or more images from the links.

7. The method as in claim 6, comprising the steps of:
fetching by the wireless browser, the images from the webpage server and displaying the images on the device screen if the number of image files is below a threshold.

8. The method as in claim 1, comprising the steps of:
a. identifying by the wireless browser, in the received webpage, image file links to a server from where the HTML formatted webpage itself has been received;
b. stopping by the wireless browser requests and receipts of the image files from these links and displaying the modified webpage with the image file links enabling a device owner to read an accompanying text and then decide to request, receive and view individual image files.

9. A mobile handheld wireless computing and communication device selected from the group of a smart phone and a tablet computer, comprising:
the handheld wireless mobile device has a processor, a memory and a wireless browser logic stored in the memory and operating in the processor, the wireless browser logic on a request from the device to a server on a global computer network receives from the server and stores in a temporary memory of the device an HTML formatted webpage;
the wireless browser logic, in the received HTML formatted webpage, first identifies ad-server reference links and then disables execution of the identified ad-server reference links from fetching ad-server image files from their respective ad-servers;
the wireless browser logic then deletes the identified ad-server reference links and collapses corresponding cells of the identified ad-server reference links from the received HTML formatted webpage, and displays a modified webpage on a display screen of the wireless device, the modified webpage reflecting the collapsed cells of the identified ad-server reference links and including an appended list of ad-server reference links deleted from the HTML, formatted webpage.

10. The device as in claim 9, comprising:
the wireless browser saves the ad-server reference links, before deleting, in an ad-server list file for display of the list at bottom of the modified webpage that enables a device owner to selectively decide to click a one or more links to request, receive and view the ad file images.

11. The device as in claim 9, comprising:
the wireless browser logic inputs parameters of a display screen size of the wireless device and a user desired font size;
the wireless browser logic uses these input parameters, parses the modified webpage into display screen size segments and displays the segments one at a time for a user to navigate from a segment to a not her segment to view a content of the received HTML formatted webpage.

12. The device as in claim 9, comprising:
a. the wireless browser identifies in the received HTML formatted webpage, image file links to a server from where the HTML formatted webpage itself has been received;
b. the wireless browser, when the number of links exceed a threshold, saves these links in an image link file and deletes the links from the HTML formatted webpage, then displays the modified webpage on the screen of the device with the image link list file at the bottom of the modified webpage that enables a user to select, fetch and display a one or more images from the links.

13. The device as in claim 12, comprising:
the wireless browser, if the number of image files is below the threshold, fetches the images from the webpage server and displays the images on the device screen.

14. The device as in claim 9, comprising:
a. the wireless browser identifies in the received HTML formatted webpage, image file links to a server from where the HTML formatted webpage itself has been received;
b. the wireless browser stops requests and receipts of the image files from these links and displays the modified webpage with the image file links that enables a device owner to read an accompanying text and then decide to request, receive and view individual image files.

15. The device as in claim 14, comprising:
the wireless browser fetches the images from the webpage server and displays the images on the device screen.

16. A system for rendering of webpage content on a screen of a handheld mobile wireless computing and communication device selected from the group of a smart phone and a tablet computer, comprising:
a. the handheld wireless mobile device has a processor, a memory, and a wireless browser logic stored in the memory and operating in the processor, for rendering of a webpage on the screen of the wireless handheld mobile device, where the wireless device receives, a requested webpage from a server on a global computer network;

b. the wireless browser logic pre-stores ad-server reference links in a list and identifies ad-server reference links in the received webpage are from this pre-stored list and then disables execution of the identified ad-server reference links in the received webpage from fetching ad-server image files from their respective ad-servers;

c. the wireless browser logic deletes the identified links in the received webpage and collapses the corresponding empty cells of the deleted links and then displays a modified webpage on the device screen, the modified webpage reflecting the collapsed cells of the identified ad-server reference links and including an appended list of ad-server reference links deleted from the received webpage.

17. The system as in claim 16, comprising:

the wireless browser logic parses the modified webpage into screen size segments and displays the segments one at a time that for a user to move from a segment to another segment to view the modified webpage.

18. The system as in claim 16, comprising:

the browser saves the links, before deleting, that are not already in the ad-server list, in the ad-server list file.

19. The system as in claim 16, comprising:

a. the browser identifies image reference links to a server from where the webpage itself has been received;

b. saves these links in an image link file and deletes the links from the received webpage, and then displays the modified webpage on the screen of the device.

20. The system as in claim 19, comprising:

the browser displays the image link list file at the bottom of the webpage and enables a user to select, fetch and display a one or more images of the links.

\* \* \* \* \*